Nov. 18, 1958
W. H. ZINN ET AL
2,861,035
CONTROL ROD
Filed Jan. 18, 1957
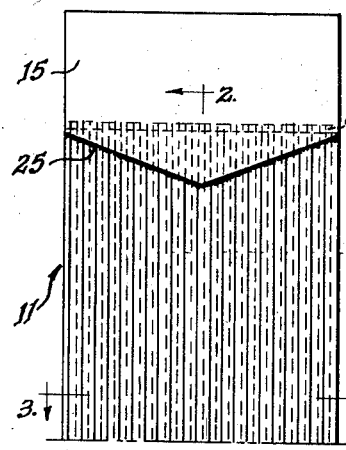
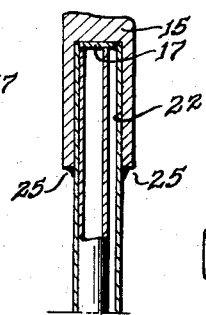
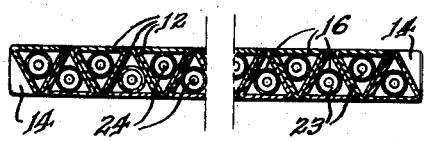
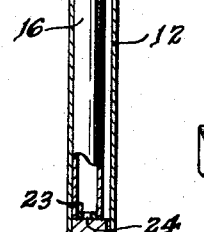
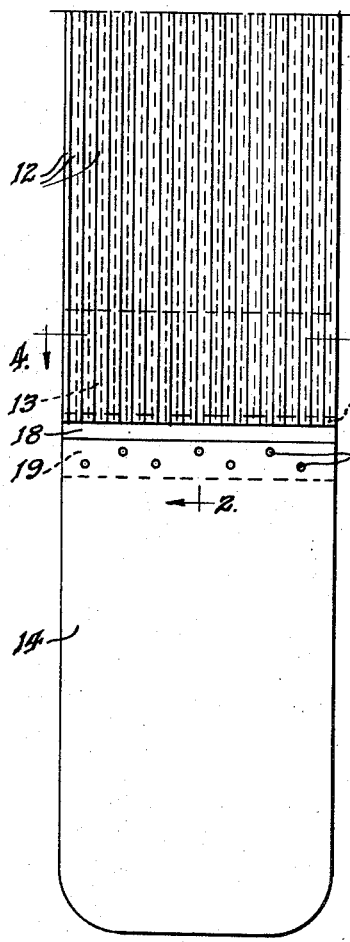
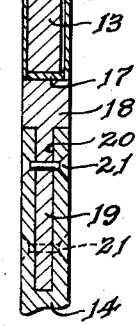
INVENTORS
Walter H. Zinn
Herbert V. Ross
BY
Roland A. Anderson
Attorney United States Patent Office 2,861,035
Patented Nov. 18, 1958

2,861,035
CONTROL ROD

Walter H. Zinn, Dunedin, Fla., and Herbert V. Ross, Palos Park, Ill., assignors to the United States of America as represented by the United States Atomic Energy Commission Application January 18, 1957, Serial No. 635,566

4 Claims. (Cl. 204—193.2)

This invention relates to a control member for a neutronic reactor and more particularly, to a member which regulates to the release of energy in a neutronic reactor by the control and absorption of neutrons.

In the operation of a neutronic reactor, the rate at which energy is released is maintained at a desired level by controlling the number of neutrons available to cause fissioning of the reactor fuel. This may be accomplished by inserting a member into the reactor that will absorb some of the neutrons present. The degree of absorption is dependent on the size, shape, location, and material of the member, among other factors. To protect the neutron-absorbing material from deterioration, it is sealed into a jacket of some material having desirable physical, chemical, and nuclear properties.

It is an object of the present invention to provide a thin wide control member for a neutronic reactor.

It is a further object of the present invention to provide a control member for a reactor that will not distort under the action of outside forces or be ruptured by gases generated within the jacketed control member by nuclear forces.

Other objects will become apparent from the detailed description that follows and from the attached drawings, in which Fig. 1 is an elevational view of the control rod of the present invention;

Fig. 2 is a sectional view taken along line 2—2 of Fig. 1;

Fig. 3 is a sectional view taken along line 3—3 of Fig. 1; and

Fig. 4 is a sectional view taken along line 4—4 of Fig. 1.

The control member of the present invention is designated by the reference numeral 11 and consists of a plurality of triangular tubes 12, a plurality of triangular neutron-absorbing slugs 13, a front end piece 14, a rear end piece 15, and a plurality of tubular retainers 16.

Each of the slugs 13 loosely fits the interior of one of the tubes 12 and has blunt corners or edges so that spaces are provided between these corners and the corners of the associated tube 12. Each of the tubular retainers 16, which is generally circular in shape and has a length approximately equal to the length of the tube 12 less the length of the slug 13, is also disposed within each tube. A short triangular plug 17 is fitted into and bonded to the ends of each tube 12, hermetically sealing the slug 13 and the tubular retainer 16 therein. Welded to the tubes at their front ends is an adaptor 18 having a tongue 19. The front end piece 14 has a slot 20 in which the tongue 19 is received and retained by rivets 21. Rear end piece 15 likewise is provided with a slot 22 which receives and retains the rear ends of the tubes 12.

Tubes 12 are joined to one another in a parallel side-to-side manner. As shown in Figs. 3 and 4, the tubes 12 are disposed in a row to give the control member 11 a wide thin shape. The thickness of the control member 11 is equal to the altitude of the triangle that is defined by the cross section of each tube 12. Each of one set of alternate tubes 12 has a side in the plane of one surface of the control member 11, and each of the other set of alternate tubes 12 has a side in the plane of the opposite surface of the control member 11. Joining of the tubes 12 is accomplished by welding or soldering.

The plugs 17 are fitted into the front and rear ends of each tube 12 to be flush with the ends of the tubes and are retained by welding the plugs along their edges to the tubes. The end of the adaptor 18 that is opposite to the tongue 19 thereof is welded to the row of tubes 12. Adaptor 18 is as wide as the row of tubes 12 and, except for the tongue 19, has a thickness equal to that of the row of tubes. The front end piece 14 is as wide and as thick as the adaptor 18 and the row of tubes 12. Slot 20 has the same dimensions as tongue 19 so that the tongue may be fitted closely into the slot where it is retained by rivets 19. Distortion is not likely to occur at the tubes 12, since the adaptor 18 to which the tubes are welded restrains the tubes from moving out of alignment.

Neutron-absorbing slugs 13 are confined to the front ends of the tubes 12 without bonding by the plugs 17 and tubular retainers 16. Each retainer 16 is tubular, rather than solid, so that space for gases generated by particle absorption by the slug 13 is provided in the tube 12, not only between the exterior of the retainer 16 and the corners of the tube 12, but also within the retainer 16. The added space for gases provided by the interior of the retainer 16 gives assurance that the gases generated in the tube 12 will not swell and rupture the tube. A thin circular insert 23, provided with a central opening 24, is welded to each retainer 16 at the end of the retainer that is adjacent to the slug 13. The insert 23 distributes over a larger area any force exerted by the retainer 16 upon the end of the slug 13 and thus eliminates the possibility that the end of the slug will be spread by the retainer and become lodged in the tube 12. The hole 24 makes the interior of the retainer 16 readily accessible for occupancy by gases generated within the tube 12.

Rear end piece 15 is as wide as the row of tubes 12, but is thicker so that the tubes may be received by the slot 22 in the rear end piece. The tubes 12 are retained within the slot 22 by welding or soldering as indicated at 25. The rear end piece 15 may be grasped to move the control member 11 within a reactor without damaging the tubes 12. Distortion of the tubes 12 is opposed by the rear end piece 15 which rigidly maintains the tubes in a fixed relationship to one another.

Control members 11 may be designed to satisfy the requirements of existing reactors. Since existing reactors have channels of a particular volume and geometry already built into them to accommodate control members, the control member 11 must be designed to have almost the same general volume and shape as the channels within the existing reactors. However, the total thermal-neutron cross section of a control member in an existing reactor can be calculated quite easily. Knowing this value, the composition and quantity of neutron-absorbing material to be provided for each slug 13 and each control member 11 can be readily determined to achieve a thermal-neutron cross section in the control member 11 equal to that of a control member in the existing reactor. The volume of material can be no greater than the volume of the channel in the existing reactor, but the composition can be varied to achieve the necessary thermal-neutron cross section within the volume allotted by the channel.

One particular reactor in which control member 11 can be employed is the reactor disclosed in the copending application of Untermyer, Serial No. 518,427, filed June 28, 1955. Untermyer employs twelve control members of boron steel plate having ¼ inch thickness, 3½ inches width, and 4 feet length, each boron steel plate being encased within a stainless steel jacket to form a member 0.290 inch thick. To replace a control rod of Untermyer with a control member 11, 19 stainless steel tubes 12 having a length of 6 ft. 1 in. and joined as shown in the drawings are required. The cross section of the space within each tube 12 is that of an equilateral triangle of 0.300 inch sides. The tubes 12 have a 0.010 inch wall thickness. One slug 13 composed of 5% cadmium and 95% silver is disposed within each of the 19 tubes 12.

Each slug 13 is 4 feet long and has the cross section of an equilateral triangle of 0.290 inch sides. Each tubular retainer 16 is of stainless steel and has a length of 2 feet, an outside diameter of 0.170 inch, and a wall thickness of 0.005 inch. Each insert 23 is 0.160 inch in diameter and each opening 24 is 0.020 inch in diameter. Each plug 17 is of stainless steel and has a length of ½ inch and a width of 0.300 inch on each of its three sides. The adaptor 18 is of stainless steel and has a width of 3.45 inches, a thickness, except for the tongue 19, of 0.280 inch, and a length, including the tongue 19, of 4 inches. The tongue 19 is 0.180 inch thick and 3 inches long. The front end piece 14 is of aluminum and is 3.45 inches wide, 0.280 inch thick, and 11 inches long. The rear end piece 15 is of stainless steel, has a width of 3.45 inches and a thickness of 0.375 inch, and extends 5 inches from the rear ends of the tubes 12. When joined the row of 19 tubes 12 has a thickness of 0.280 inch, a length of 6 ft. 1 in., a width of 3.45 inches on one side, and a width of 3.14 inches on the other side. The slot 19 of the front end piece is 0.180 inch thick, 3.45 inches wide, and 3 inches deep. The slot 22 of the rear end piece is 0.280 inch thick and from ½ to 1 inch deep. The control member 11, overall, is 0.280 inch thick, 3.45 inches wide, and is 90 inches long.

Prior to the present invention, it was necessary to replace entire control members when the neutron-absorbing slugs 13 became deteriorated due to the cumulative effects of repeated particle and radiation absorption. Total replacement was mandatory since control member constructions in the past have so completely integrated the neutron-absorbing material with the overall control member that it was not possible to remove the depleted neutron-absorbing material for replacement without destroying the control member. The control member 11 of the present invention, however, has been designed to permit easy and rapid removal and replacement of depleted neutron-absorbing slugs 13. To accomplish removal of depleted neutron-absorbing slugs 13, the control member 11 is cut in the plane of the contacting surfaces of the neutron-absorbing slugs 13 and the plugs 17 at the front ends of the tubes 12. This operation permits the slugs 13 to drop out of the tubes 12, whereupon new slugs of the same or of different material and length are inserted. New plugs 17 are welded into the front ends of the tubes 12 and the previously removed section of the control member 11, comprising the old plugs 17, the front end piece 14, and adaptor 18, is rewelded to the front ends of the tubes. It is readily observed that each time the slugs 13 are replaced, the length of the space within the tubes 12 is reduced by an amount equal to the length of a plug 17. To compensate for this reduction in length, tubular retainers 16 are accordingly reduced in length each time new slugs 13 are installed.

The unbonded relationship of slugs 13 and retainers 16 to the inner walls of the tubes 12 is essential to the easy and rapid slug replacement operation just described. The small spaces existing between the inner walls of the tubes 12, the slugs 13, and the retainers 16, however, serve another purpose. Because of these spaces, gases generated on the surface of the slugs 13 by particle and radiation absorption cannot accumulate in local areas to blister and rupture the tubes 12. Instead, gases so generated distribute themselves throughout the entire available space within the tubes 12, including the space within the retainers 16. The gas pressure within the tubes 12 increases with time because of the continuous generation of gases. However, tests have indicated that stainless steel tubes 12 having a wall thickness of 20 mils and integrated in a control member 11 will withstand an internal pressure of 40,000 p. s. i. before splitting. Since it would take an exceedingly long time for the gases generated within the tubes 12 to approach a pressure of 40,000 p. s. i., breakdown of the control member 11 due to internal gas pressure presents no matter of real concern. A group of control members 11 has been in continuous use within a reactor for more than a year to the present time, and no sign of splitting, blistering, swelling, warping, twisting, or other serious defect has been detected.

It is intended to limit the invention only within the scope of the appended claims.

What is claimed is:

1. A control member for a neutronic reactor comprising a plurality of triangular tubes joined side-to-side in a parallel relationship to form an element having a void space provided therein and two parallel surfaces, each tube having a side in the plane of one surface and an edge in the plane of the other surface, a neutron-absorbing slug hermetically sealed within each tube in fixed relationship thereto, said slugs being of substantially less volume than the internal volume of the tubes, a hollow retainer hermetically sealed within each tube in end-to-end relationship with the slugs to generally fix the positions thereof and to provide void spaces within the tubes, a triangular plug joined to the interior of each tube at each end to seal the slugs and the retainers within the tubes, and an end piece joined to the ends of the tubes to provide rigidity for the control member.

2. A control member for a neutronic reactor comprising a plurality of tubes having void spaces provided therein and joined side-to-side in a parallel relationship, a neutron-absorbing slug hermetically sealed within each tube in fixed relationship thereto, said slugs being of substantially less volume than the internal volume of the tubes, a plug joined to the interior of each tube at each end to seal the slugs within the tubes, and an end piece joined to the ends of the tubes to provide rigidity for the control member.

3. A control member for a neutronic reactor comprising a plurality of tubes having void spaces provided therein and joined side-to-side in a parallel relationship, a neutron-absorbing slug hermetically sealed within each tube in fixed relationship thereto, said slugs being of substantially less volume than the internal volume of the tubes, and an end piece joined to the ends of the tubes to seal the slugs within the tubes and to provide rigidity for the control member.

4. A control member for a neutronic reactor comprising a plurality of tubes having void spaces provided therein and joined side-to-side in a parallel relationship, a neutron-absorbing slug hermetically sealed within each tube in fixed relationship thereto, said slugs being of substantially less volume than the internal volume of the tubes, a hollow retainer hermetically sealed within each tube in end-to-end relationship with the slugs to generally fix the positions thereof within the tubes, and a plug joined to each end of each tube to seal the slugs and the retainers within the tubes.

References Cited in the file of this patent

Proceedings of the International Conference on the Peaceful Uses of Atomic Energy, United Nations, N. Y., vol. 2 (1956), pages 404, 408; vol. 3 (1955), pages 59, 60, 302–305.

Research Reactors (TID–5275), U. S. Government Printing Office, 1955, pages 101, 145.